United States Patent
Maeda (10) Patent No.: US 6,643,382 B1
(45) Date of Patent: Nov. 4, 2003

(54) IMAGE PROCESSING METHOD, IMAGE PROCESSING APPARATUS, IMAGE PROCESSING SYSTEM AND MEMORY MEDIUM

(75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,426

(22) Filed: Aug. 27, 1999

(30) Foreign Application Priority Data

Aug. 31, 1998 (JP) .......................................... 10-260901

(51) Int. Cl.[7] .................................................. G06K 9/00
(52) U.S. Cl. ...................................... 382/100; 358/3.28
(58) Field of Search .............................. 382/100, 232, 382/305, 306; 380/4, 54, 255, 269, 200, 201, 28, 232; 358/434, 435, 464, 1.15, 3.28; 348/143; 701/10; 704/273; 705/50

(56) References Cited

U.S. PATENT DOCUMENTS

| | | | | |
|---|---|---|---|---|
| 5,502,576 A | * | 3/1996 | Ramsay et al. | 358/403 |
| 5,568,570 A | * | 10/1996 | Rabbani | 348/394.1 |
| 5,646,997 A | * | 7/1997 | Barton | 380/201 |
| 5,659,726 A | * | 8/1997 | Sandford et al. | 358/464 |
| 5,710,834 A | * | 1/1998 | Rhoads | 380/202 |
| 5,765,176 A | * | 6/1998 | Bloomberg | 16/16 |
| 5,778,102 A | * | 7/1998 | Sandford et al. | 382/239 |
| 5,809,139 A | * | 9/1998 | Girod et al. | 380/202 |
| 5,822,432 A | * | 10/1998 | Moskowitz et al. | 380/28 |
| 5,875,249 A | * | 2/1999 | Mintzer et al. | 283/113 |
| 5,930,369 A | * | 7/1999 | Cox et al. | 283/113 |
| 5,946,414 A | * | 8/1999 | Cass et al. | 382/183 |
| 5,956,716 A | * | 9/1999 | Kenner et al. | 707/10 |

OTHER PUBLICATIONS

U.S. application Ser. No. 09/452,185, Gims, filed Dec. 2, 1999.

* cited by examiner

*Primary Examiner*—Jayanti K. Patel
(74) *Attorney, Agent, or Firm*—Fitzpatrick, Cella, Harper & Scinto (57) ABSTRACT

The invention provides an image processing apparatus for embedding visible specified information (electronic watermark information etc.) in an image in a manner not easily removable. For this purpose first embedding means embeds first specified information (publicly open) in the digital image entered by input means. Second embedding means embeds second specified information (disclosed only to specified user of equipment) in the digital image in which the first specified information is embedded.

11 Claims, 6 Drawing Sheets

IMAGE PROCESSING METHOD, IMAGE PROCESSING APPARATUS, IMAGE PROCESSING SYSTEM AND MEMORY MEDIUM

BACKGROUND OF THE INVENTION

1. Field of the Invention

The present invention relates to an image processing method for illegal use of a digital image by embedding therein certain information such as electronic watermark information, an image processing apparatus and an image processing system such as a video camera utilizing such image processing method, and a computer readable memory medium storing process steps for executing such image processing method.

2. Related Background Art

The recording and reproduction of an image has conventionally be achieved by an analog video tape recorder (VTR) utilizing a recording medium on which the image signal is recorded in analog format (hereinafter called analog medium).

However, the image recorded on an analog medium is deteriorated in quality as the copying is repeated.

It has therefore become common, in recent years, to execute the image recording and reproduction with a VTR of digital type utilizing a recording medium on which the image is recorded in digital format (hereinafter called digital medium).

The image recorded on a digital medium has features of being not deteriorated in quality even after repeated copying, being easily handled on a computer and being easily transmitted through a communication line, but may cause illegal use of copyright because the unlawful copying or use can be easily achieved.

For preventing such illegal copying or use, there is known a method of embedding electronic watermark information into the image.

Such electronic watermark embedding method employs the digital ID information indicating for example the copyright owner of the image, the publication source of the image, the management number of the image, the distribution channel of the image etc. as the electronic watermark information, and mixes such electronic watermark information in the image in such a manner that such information is invisible to the user observing the image and that the source or channel of distribution of the illegally used image can be confirmed afterwards. In such information mixing, it is important that the electronic watermark information alone cannot be extracted from the image in which the electronic watermark information is embedded.

In such electronic watermark embedding method, the general user cannot see the content of the electronic watermark information, because such method is so constructed that the user cannot see whether the electronic watermark information is present in the image or the content of the electronic watermark information itself.

In certain cases, however, it is unnecessary to conceal all the content of the electronic watermark information and a part of the content may or should be made open to the general user.

In such case, the electronic watermark information has been disclosed to the user by embedding the watermark information visible to the user in the image whereby the user is rendered possible to display such information.

Such method has however been associated a drawback that such visible electronic watermark information can be removed relatively easily from the image in which such watermark information is embedded.

SUMMARY OF THE INVENTION

An object of the present invention is to solve the above-described drawbacks individually or entirely.

Another object of the present invention is to provide an image processing method capable of embedding specified visible information in an image in a not easily removable manner, an image processing apparatus and an image processing system utilizing such image processing method, and a computer readable memory medium storing the process steps for realizing such image processing method.

The above-mentioned objects can be attained, according to a first invention, by an image processing method for embedding specified information in a digital image, comprising a first embedding step of embedding first specified information in the digital image, and a second embedding step of embedding second specified information in the digital image in which the first specified information is embedded by the first embedding step.

Still another object of the present invention is to obtain respectively different embedding levels for plural embedded information.

Still another object of the present invention is to provide a novel information embedding method, an apparatus and a medium therefor.

Still other objects of the present invention, and the features thereof, will become fully apparent from the following description of embodiments, which is to be taken in conjunction with the attached drawings.

DETAILED DESCRIPTION OF THE PREFERRED EMBODIMENTS

Now the present invention will be clarified in detail by preferred embodiments thereof, with reference to the attached drawings.

First Embodiment

Figure 1:
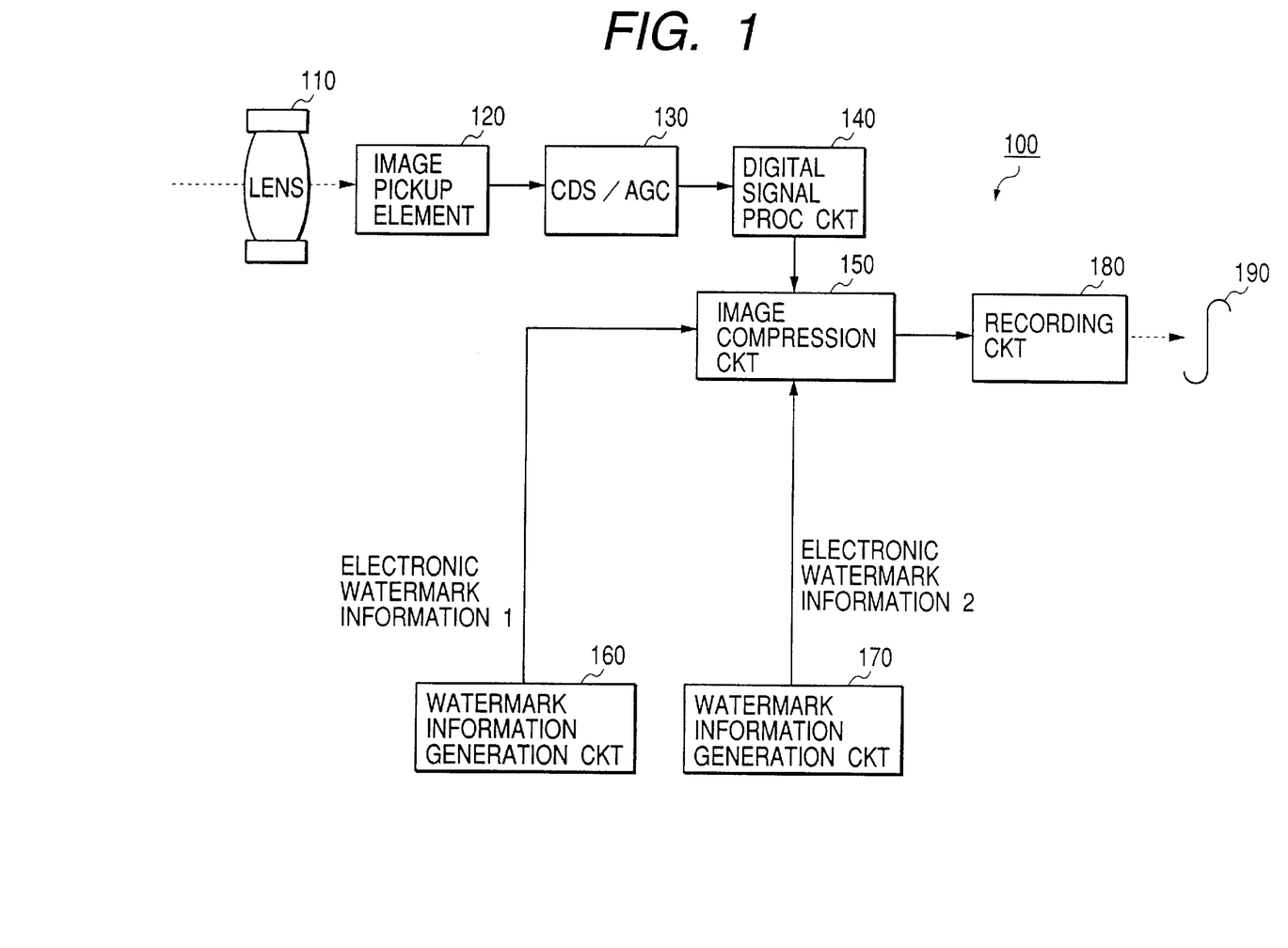
FIG. 1 is a block diagram showing the configuration of a video camera constituting a first embodiment of the present invention.

The present invention is applicable for example to a video camera 100 as illustrated in FIG. 1.

The video camera 100 is provided, as shown in FIG. 1, with a lens 110 for capturing the light from an object; an image pickup element 120 for converting the light from the object, coming through the lens 110, into an electrical image signal; a CDS/AGC circuit 130 for executing sampling-holding on the image signal from the image pickup element 120 thereby obtaining an appropriate signal level; a digital signal process circuit 140 for digitizing the image signal from the CDS/AGC circuit 130 and effecting predetermined digital signal process thereon; an image compression circuit 150 for applying a predetermined compression process on the image data from the digital signal process circuit 140; and a recording circuit 180 for recording the compressed image data, from the image compression circuit 150, on a recording medium 190 such as a video tape.

The above-described video camera 100 is most featured by a fact that the image compression circuit 150 executes compression of the image data and embedding (superposition) of specified information (called "electronic watermark information").

For this purpose, the video camera 100 is provided, in addition to the foregoing configuration, with two watermark information generating circuit 160, 170 for respectively generating electronic watermark information.

Figure 2:
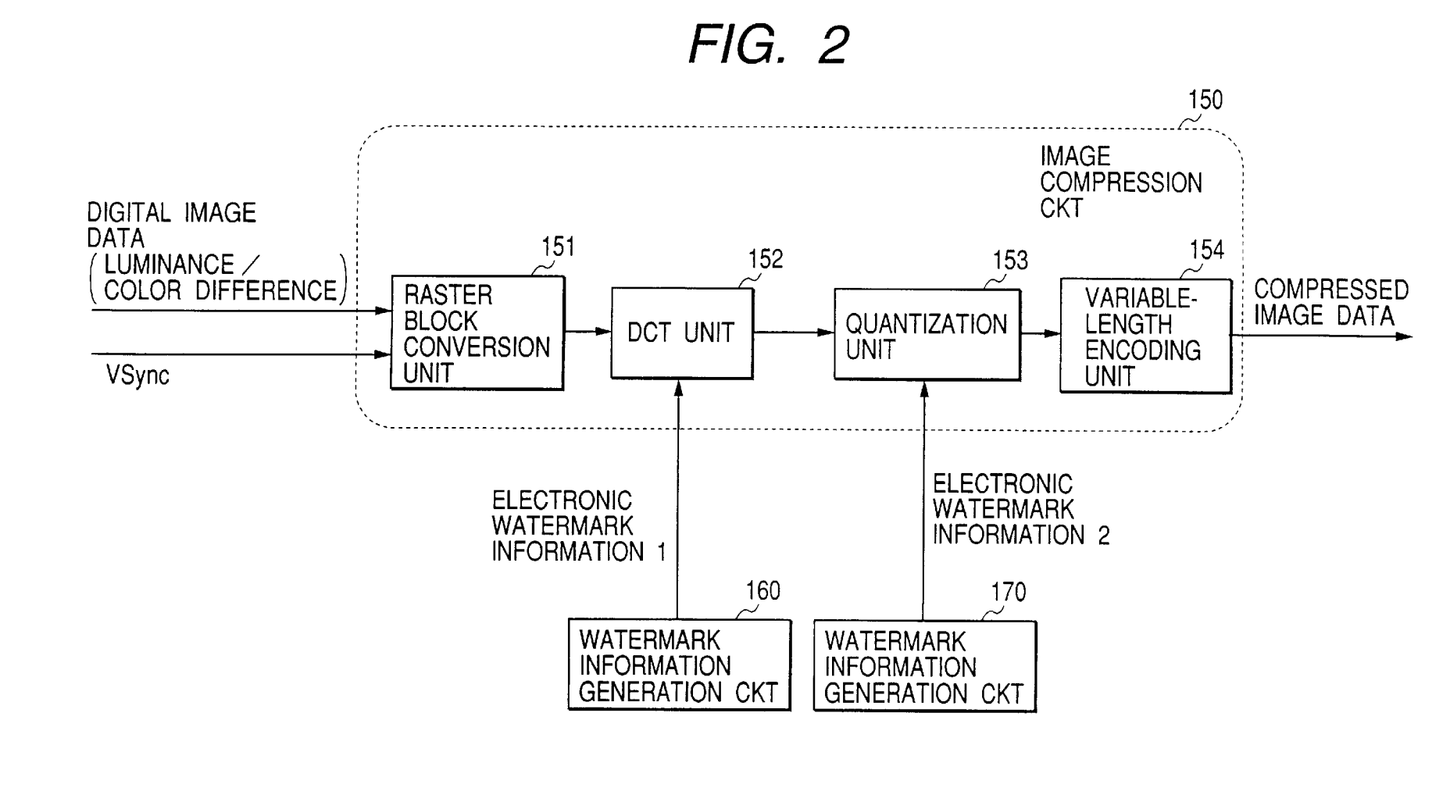
FIG. 2 is a block diagram showing the configuration of an image compression circuit of the above-mentioned video camera.

Therefore, the image compression circuit 150 is provided, as shown in FIG. 2, with a raster block conversion unit 151 receiving image data from the digital signal process circuit 140, a DCT unit 152 receiving the outputs from the raster block conversion unit 151 and the watermark information generation circuit 160, a quantization unit 153 receiving the outputs of the DCT (discrete cosine transformation) unit 152 and the watermark information generation circuit 170, and a variable length encoding unit 154 receiving the output of the quantization unit 153, wherein the output of the variable length encoding unit 154 is supplied to the recording circuit 180.

In the following there will be explained the embedding process of the electronic watermark information, constituting the largest feature of the video camera 100.

At first, the light from the object, coming through the lens 110, is converted by the image pickup element 120 into an image signal which is supplied through the CDS/AGC circuit 130 to the digital signal process circuit 140 and is digitized therein.

The image data (original image data) obtained by the digitization are compressed in the image compression circuit 150 and recorded on the recording medium by the recording circuit 180. In this operation, the image compression circuit 150 executes the compression process and the superposing process of the electronic watermark information in the following manner.

In the image compression circuit 150, the raster block conversion unit 151 divides the image data from the digital signal process circuit 140, namely the image data consisting of luminance data and color difference data, into blocks of a predetermined size.

The DCT unit 152 executes DCT (discrete cosine transformation) in the unit of a block, on the image data supplied from the raster block conversion unit 151 and divided into blocks.

The watermark information generation circuit 160 generates, for supply to the DCT unit 152, electronic watermark information which can be made open to the general user (hereinafter called "electronic watermark information 1") and of which extraction method is made open to the public.

The DCT unit 152 executes spectrum diffusion of the electronic watermark information 1 from the watermark information generation circuit 160 and superposes such information with the DCT coefficients (frequency components of the original image data) obtained in the above-mentioned DCT process.

More specifically, the electronic watermark information is converted with the publicized diffusion codes and is added to the corresponding frequency components among the DCT coefficients.

The image data, in which the electronic watermark information 1 is embedded by the above-described embedding method, are supplied to the quantization unit 153.

The quantization unit 153 executes quantization on the image data supplied from the DCT unit 152.

In this state, the electronic watermark information generation circuit 170 generates electronic watermark information that can be disclosed to specified users or equipment only (hereinafter called "electronic watermark information 2") of which the extracting method is disclosed only to the specified users or equipment. The electronic watermark information 2 is for example information embedded in the quantizing coefficients to be used in the quantization process in the quantization unit 153.

Therefore the quantization unit 153 quantizes the image-data from the DCT unit 152 while varying the quantizing coefficients little by little according to the electronic watermark information 2 from the watermark information generation circuit 170, thereby embedding the electronic watermark information 2 into the image data.

The image data, in which the electronic watermark information 2 is embedded by the quantization process with variation of the quantizing coefficients, are subjected to variable length encoding in the variable length encoding unit 154 and are supplied, as compressed image data, to the recording circuit 180.

Consequently the compressed image data, recorded on the recording medium 190 by the recording circuit 180, contain the electronic watermark information 1 and the electronic watermark information 2 embedded therein.

Figure 3:
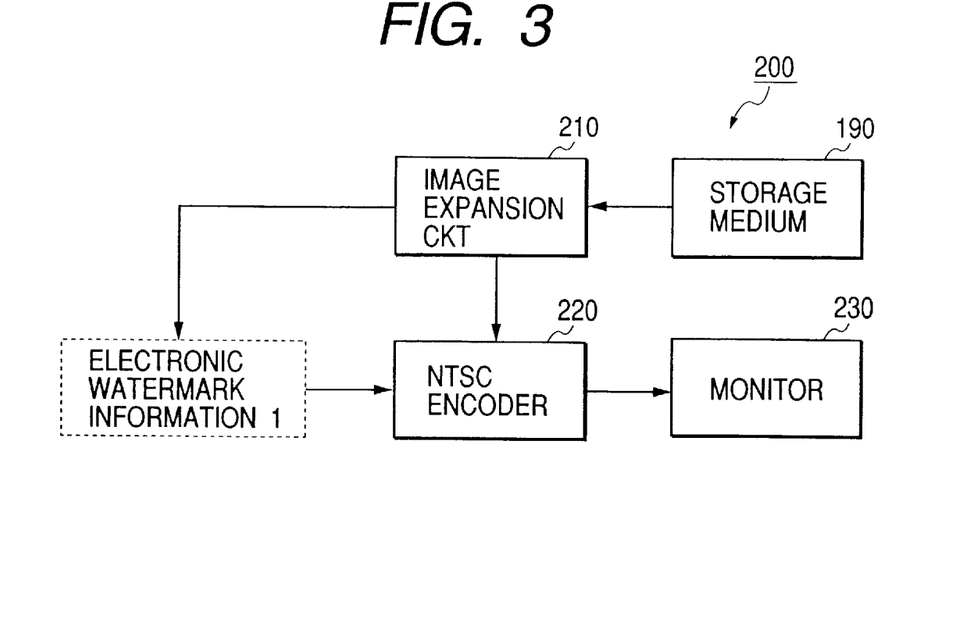
FIG. 3 is a block diagram showing the configuration of an apparatus for reproducing the compressed image data recorded on a recording medium by the above-mentioned video camera.

The compressed image data recorded on the above-mentioned recording medium 190 can be reproduced by a reproducing apparatus 200 as shown in FIG. 3.

The reproducing apparatus 200 is provided, as shown in FIG. 3, with an image expansion circuit 210 for expanding the compressed image data recorded on the recording medium 190 thereby restoring the image data prior to compression, an NTSC encoder 220 for generating the signal of a predetermined television format (NTSC format) based on the image data from the image expansion circuit 210, and a monitor 230 for executing image display according to the NTSC signal from the NTSC encoder 220.

In case the reproducing apparatus 200 is usable by the unspecified general user, the image expansion circuit 210 expands the compressed image data by an inverse DCT process and an inverse quantization and extracts the electronic watermark information 1 embedded in the above-mentioned compressed image data, utilizing the publicized extraction method for the electronic watermark information 1, namely a method inverse to the aforementioned embedding method utilizing the publicized diffusion codes.

The NTSC encoder 220 of the present embodiment generates the NTSC signal by expanding the image data before compression obtained by the image expansion circuit 210 and simply adding the extracted electronic watermark information 1.

Figure 4:
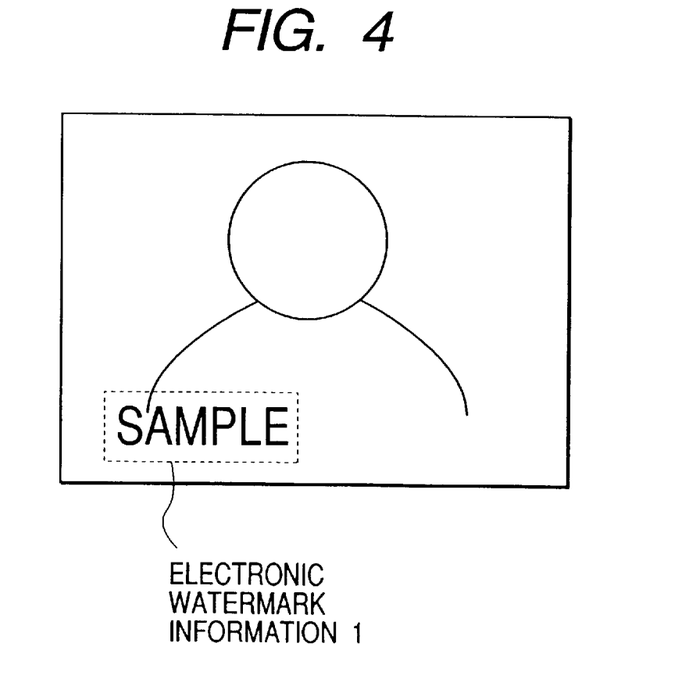
FIG. 4 is a view showing an image displayed on a monitor on the above-mentioned reproducing apparatus.

The monitor 230 executes image display of the NTSC signal from the NTSC encoder 220. As an example, if the electronic watermark information 1 is character information "sample", there is displayed, as shown in FIG. 4, the original image superposed with the information "sample".

As the extraction method for the electronic watermark information 2 is not made public to the general user, the reproducing apparatus 200 usable by the general user can extract the electronic watermark information 1 from the compressed image data recorded on the recording medium, but cannot extract the electronic watermark information 2. Also it is not possible to delete the electronic watermark information 2.

In case the reproducing apparatus 200 is to be used by the specified user, the image expansion circuit 210 also executes extraction of the electronic watermark information 2, utilizing the extraction method therefor publicized to the specified users only. Thus the NTSC encoder 220 mixes the image data, the electronic watermark information 1 and the electronic watermark information 2 whereby the monitor 230 displays the original image with the electronic watermark information 1 and the electronic watermark information 2 superposed thereon.

In the present embodiment, as explained in the foregoing, the compressed image data are subjected to the superposition of the electronic watermark information 1, of which extraction method is made public to the general user, and then subjected to the superposition of the electronic watermark information 2 of which extraction method is made open only to the specified user. The electronic watermark information 1 is superposed with the compressed image data by the superposing method publicized to the general user, and the electronic watermark information 2 is superposed with the compressed image data, already superposed with the electronic watermark information 1, by the superposing method publicized only to the specified user.

Such configuration allows the general user to see the content of the electronic watermark information 1 but not the content of the electronic watermark information 2. Also, the electronic watermark information 1 and 2 has to be removed together in order to completely eliminate the electronic watermark information from the image, so that it is very difficult for the general user to eliminate such electronic watermark information.

Second Embodiment

Figure 5:
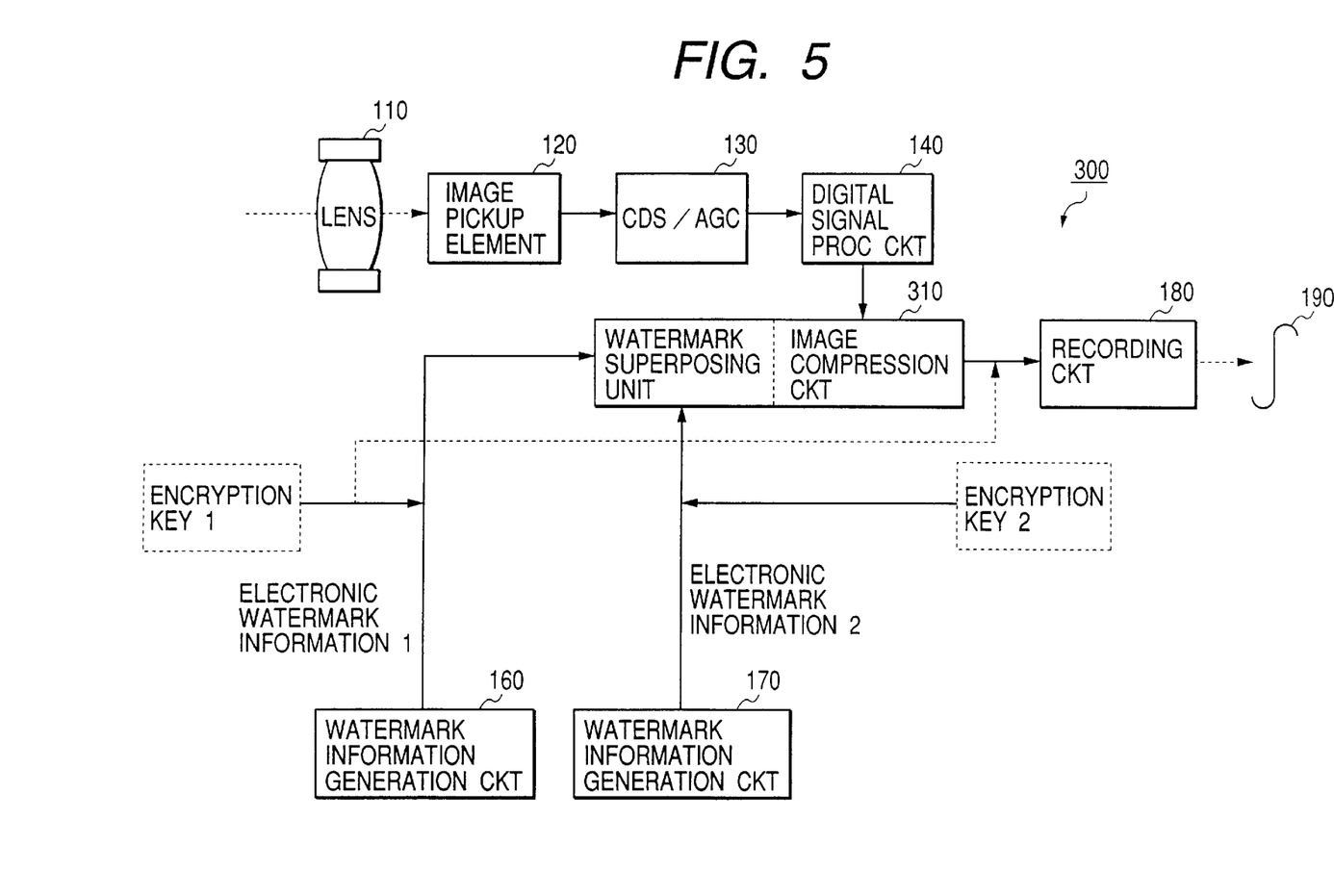
FIG. 5 is a block diagram showing the configuration of a video camera constituting a second embodiment of the present invention.

The present invention is applicable for example to a video camera 300 shown in FIG. 5.

The video camera 300 is similar in configuration to the above-described video camera 100 shown in FIG. 1, but the superposition of the electronic watermark information 1 and 2 is executed, in the video camera 100, by the DCT unit 152 and the quantization unit 153 of the image compression circuit 310 while the superposition is executed, in the video camera 300, by a watermark superposition unit of the image compression circuit 310.

In the video camera 300 shown in FIG. 5, components same as those in the video camera 100 shown in FIG. 1 are represented by same numbers and will not be explained further.

Figure 6:
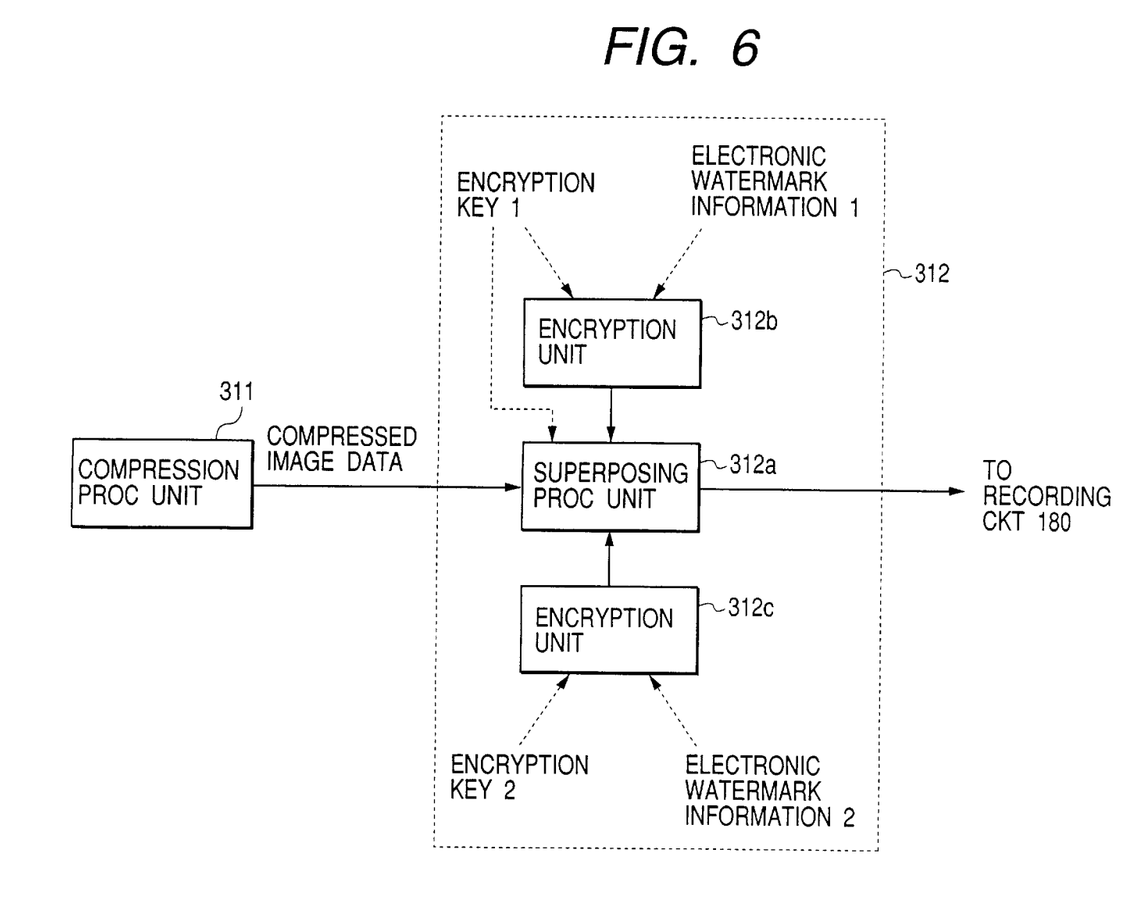
FIG. 6 is a block diagram showing the configuration of an image compression circuit in the above-mentioned video camera.

More specifically, the image compression circuit 310 is provided, as shown in FIG. 6, with a compression process unit 311 for compressing the image data from the digital signal process circuit 140 to obtain compressed image data, and a watermark superposing unit 312 for superposing the electronic watermark information 1 and 2 in the compressed image data from the compression process unit 311, whereby the output of the watermark superposing unit 312 is supplied to the recording circuit 180.

The watermark superposing unit 312 is provided with an encryption unit 312b for encrypting the electronic watermark information 1 from the watermark information generation circuit 160 utilizing an encryption key 1, an encryption unit 312c for encrypting the electronic watermark information 2 from the watermark information generation circuit 170 utilizing an encryption key 2, and a superposition unit 312a for superposing, with the compressed image data from the compression process unit 311, the encrypted data obtained in the encrypting units 312b, 312c and the encryption key 1.

The encryption key 1 is made public to the general users, while the encryption key 2 is made open only to the specified users.

At first the compression process unit 311 obtains the compressed image data by executing, on the image data from the digital signal process circuit 140, the above-described processes such as the raster block conversion, DCT process, quantization and variable length encoding.

The obtained compressed image data are supplied to the superposition process unit 312a.

The encrypting unit 312b encrypts the electronic watermark information 1 from the watermark information generation circuit 160, utilizing the encryption key 1, and the resulting encrypted data 1 are supplied to the superposition process unit 312a.

Also the encrypting unit 312c encrypts the electronic watermark information 2 from the watermark information generation circuit 170, utilizing the encryption key 2, and the resulting encrypted data 2 are supplied to the superposition process unit 312a.

The superposition process unit 312a superposes the encrypted data 1 from the encryption unit 312b, the encrypted data 2 from the encryption unit 312c and the encryption key 1 employed in the encryption unit 312c with the compressed image data obtained in the compression process unit 311, and sends the obtained data to the recording circuit 180. Such superposition process unit can employ various superposing methods, for example multiplexing or embedding divided codes.

Consequently the recording medium 190 records, by the recording circuit 180, the compressed image data in which the encrypted data 1, the encrypted data 2 and the encryption key 1 are superposed.

Figure 7:
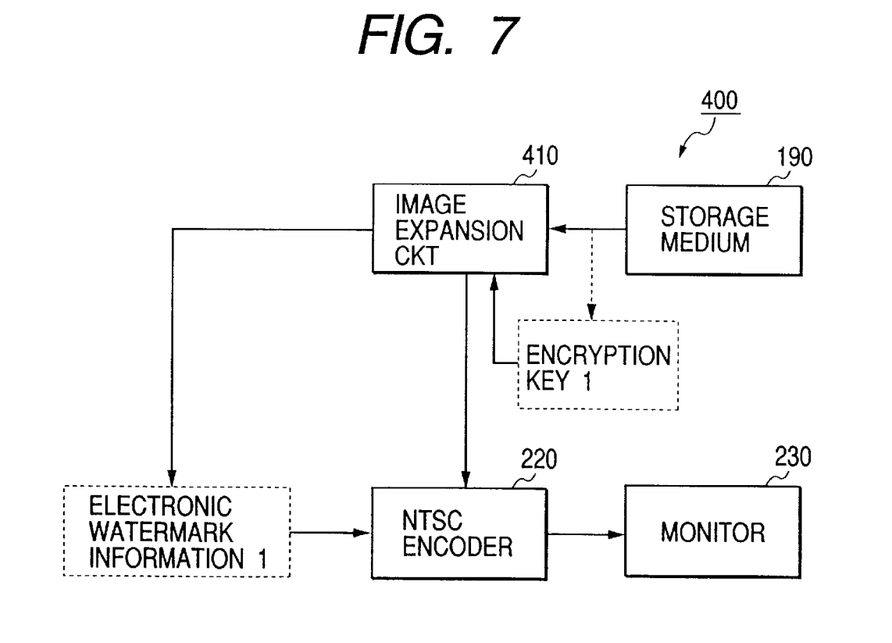
FIG. 7 is a block diagram showing the configuration of an apparatus for reproducing the compressed image data recorded on a recording medium by the above-mentioned video camera.

The compressed image data thus recorded on the recording medium 190 are reproduced by a reproducing apparatus 400 as shown in FIG. 7.

In the reproducing apparatus 400 shown in FIG. 7, components same as those in the reproducing apparatus 1. 200 shown in FIG. 3 are represented by same numbers and will not be explained further.

In case the reproducing apparatus 400 is usable by the unspecified general users, an image expansion circuit 410 expands the compressed image data, recorded on the recording medium 190, by inverse DCT process and inverse quantization, and restores the electronic watermark information 1 contained in the compressed image data, utilizing the encryption key 1 contained therewith.

The NTSC encoder 220 mixes the image data prior to compression, obtained in the image expansion circuit 210, and the electronic watermark information 1 restored with the encryption key 1, thereby generating an NTSC signal.

The monitor 230 executes image display of the NTSC signal from the NTSC encoder 220. Thus the monitor 230 displays the original image on which the electronic watermark information 1 is superposed.

Since the encryption key 2 for restoring the electronic watermark information 2 is not disclosed to the general users, the reproducing apparatus 400 usable by the general user can extract the electronic watermark information 1 only from the compressed image data recorded on the recording medium 190 but cannot extract the electronic watermark information 2. Also it is not possible to delete the electronic watermark information 2.

In case the reproducing apparatus 400 is to be used by the specified users only, the image expansion circuit 410 also restores the electronic watermark information 2, utilizing the encryption key 2 disclosed to the specified users only. Thus the NTSC encoder 220 mixes the image data with the electronic watermark information 1 and 2, whereby displayed is the original image superposed with the electronic watermark information 1 and 2.

In the present embodiment, as explained in the foregoing, means for superposing the electronic watermark information 1 and 2 with the compressed image data is constructed as one of the watermark superposing units 312. Consequently there can be obtained a cost reduction in the apparatus, in addition to the effect of the foregoing first embodiment.

In the foregoing embodiments, the compression of the image data is achieved by DCT process, but such method is not restrictive and there may be employed other methods such as wavelet transformation or other orthogonal transformations.

Also the apparatus of the foregoing embodiments may be provided with transmission means for transmitting the digital image signal in which specified information is embedded, thereby embedding various information in such transmitted image information.

The objects of the present invention can naturally be attained also in a case where a memory medium storing the program codes of a software for realizing the functions of the host equipment and the terminals in the aforementioned embodiments is supplied to a system or an apparatus and a computer (CPU or MPU) in the above-mentioned system or apparatus reads and executes the program codes stored in the memory medium.

In such case the program codes themselves read from the memory medium realize the functions of the aforementioned embodiments, and the memory medium storing such program codes constitute the present invention.

The memory medium storing such program codes can be, for example, a ROM, a floppy disk, a hard disk, an optical disk, a magnetooptical disk, a CD-ROM, a CD-R, a magnetic tape, a non-volatile memory card.

The present invention also includes, not only the case where the functions of the aforementioned embodiments are realized by the execution of the read program codes by the computer, a case where an operating system or the like functioning on the computer executes all the process or a part thereof according to the instructions of the program codes, thereby realizing the functions of the aforementioned embodiments.

The present invention further includes a case wherein the program codes read from the memory medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the aforementioned embodiments.

As explained in the foregoing, the embodiments are so constructed as to embed first specified information in the digital image in not easily visible manner and to further embed second specified information.

It thus becomes very difficult to eliminate the specified information from the digital image, since not only the first specified information but also the second specified information have to be eliminated in order to completely remove the specified information (such as electronic watermark information) from the digital image.

It is thus rendered possible to realize embedding of the specified information of an increased strength. It is also possible to publicize only a part of the specified information attached to the digital image.

More specifically, the original digital image is subjected to an orthogonal transformation such as DCT process, and the transformation coefficients (frequency components) thus obtained are subjected to the embedding (superposition) of the first electronic watermark information (first specified information) by spectrum diffusion. Such embedding may be achieved by a publicly known method. In the quantization, after the orthogonal transformation, of the digital image in which the first electronic watermark information is thus embedded, the quantization coefficient employed in such quantization process is varied little by little according to the second electronic watermark information (second specified information) thereby embedding such second electronic watermark information. This embedding method is assumed to be disclosed only to the specified users or equipment.

Therefore, as the general users or equipment can only publicly know the embedding method of the first electronic watermark information, or the extraction method thereof, such general users or equipment can only extract the first electronic watermark information and can only see the content thereof. On the other hand, as the specified users or equipment can know the extraction method of the first and second electronic watermark information, such specified users or equipment can extract both electronic watermark information and can see the contents thereof.

There may also be adopted a configuration adapted, after the compression of the digital image, to embed first specified information (encrypted data) encrypted with a publicly open key (first encryption key) and second specified information (encrypted data) encrypted with a key made open only to the specified users or equipment (second encryption key) into the compressed digital image.

In such configuration, since the first encryption key alone is made public to the general users or equipment, such general user can only restore the first specified information and see the content thereof. On the other hand, since the first and second encryption keys are both made known to the specified users or equipment, such specified users can extract both the first and second specified information and see the contents thereof. Also this configuration can reduce the cost of the apparatus or the system, as there is required only one means for embedding the specified information.

The present invention is subject to various modifications within the scope and spirit of the appended claims. In particular, the information embedding method and the encrypting method are not limited to those described in the foregoing embodiments but can be replaced by various methods such as methods suitable for data compression.

What is claimed is:

1. An image processing method for embedding specified information into a digital image, comprising:
   a first embedding step of embedding first specified information in said digital image;
   a second embedding step of embedding second specified information in the digital image in which the first specified information is embedded by said first embedding step;
   a compression step of compressing said digital image through plural compression stages,
   wherein said first embedding step includes a step of embedding said first specified information at an arbitrary stage among the plural compression stages in said compression step, and
   said second embedding step includes a step of embedding said second specified information in a stage next to said arbitrary stage.

2. An image processing method according to claim 1, wherein said first specified information is publicly open information, and said second specified information is made open to a specified user or equipment.

3. An image processing method according to claim 1, wherein:
   said compression step at least includes an orthogonal transformation step for effecting an orthogonal transformation on said digital image, and a quantization step of quantizing transformation coefficients obtained in said orthogonal transformation step;
   said first embedding step includes a step of superposing said first specified information by spectrum diffusion with the transformation coefficients obtained in said orthogonal transformation step; and
   said second embedding step includes a step of varying the quantization coefficients in said quantization step, based on said second specified information.

4. An image processing apparatus comprising:
   input means for inputting an original digital image;
   first embedding means for embedding first specified information in the digital image inputted by said input means;
   second embedding means for embedding second specified information in the digital image in which the first specified information is embedded by said first embedding means; and
   compression means for compressing the digital image inputted by said input means through plural compression stages,
   wherein said first embedding means is adapted to embed said first specified information in an arbitrary stage among the plural compression stages in said compression means, and
   said second embedding means is adapted to embed said second specified information in a stage next to said arbitrary stage.

5. An image processing apparatus according to claim 4, wherein said first specified information is publicly open information, and said second specified information is disclosed only to a specified user or equipment.

6. An image processing apparatus according to claim 4, wherein:
   said compression means at least includes orthogonal transformation means for executing orthogonal transformation on the digital image inputted by said input means and quantization means for quantizing transformation coefficients obtained by said orthogonal transformation means;
   said first embedding means is adapted, in said orthogonal transformation means, to superpose said first specified information by spectrum diffusion with the transformation coefficients obtained by said orthogonal transformation means; and
   said second embedding means is adapted, in said quantization means, to vary the quantization coefficients in said quantization means according to said second specified information.

7. An image processing system consisting of mutually connected plural equipment capable of transmitting and receiving a digital image with specified information embedded therein, the system comprising:
   input means for inputting an original digital image;
   first embedding means for embedding first specified information in the digital image inputted by said input means;
   second embedding means for embedding second specified information in the digital image in which the first specified information is embedded by said first embedding means;
   transmission means for transmitting, through a network, the digital image in which said second specified information is embedded by said second embedding means, and
   compression means for compressing the digital image inputted by said input means through plural compression stages,
   wherein said first embedding means is adapted to embed said first specified information in an arbitrary stage among the plural compression stages in said compression means, and
   said second embedding means is adapted to embed said second specified information in a stage next to said arbitrary stage.

8. An image processing system according to claim 7, wherein said network is internet.

9. A computer readable memory medium storing process steps for embedding specified information in a digital image, the process steps comprising:
   a first embedding step of embedding first specified information in said digital image;
   a second embedding step of embedding second specified information in the digital image in which the first specified information is embedded by said first embedding step; and
   a compression step for compressing said digital image through plural compression stages;
   wherein said first embedding step includes a step of embedding said first specified information at an arbitrary stage among the plural compression stages in said compression step; and
   said second embedding step includes a step of embedding said second specified information in a stage next to said arbitrary stage.

10. A memory medium according to claim 9, wherein said first specified information is publicly open information, and said second specified information is made open to a specified user or equipment.

11. An image processing system consisting of mutually connected plural equipment capable of transmitting and receiving a digital image with specified information embedded therein, the system comprising:

an inputter for inputting an original digital image;

a first embedding circuit for embedding first specified information in the digital image inputted by said inputter;

a second embedding circuit for embedding second specified information in the digital image in which the first specified information is embedded by said first embedding circuit; and a transmitter for transmitting, through a network, the digital image in which said second specified information is embedded by said second embedding circuit, and further comprising a compressor for compressing the digital image inputted by said inputter through plural compression stages, wherein said first embedding circuit is adapted to embed said first specified information in an arbitrary stage among the plural compression stages in said compressor, and said second embedding circuit is adapted to embed said second specified information in a stage next to said arbitrary stage.

* * * * *